June 11, 1968 — A. HEINECKE ET AL — 3,387,644
FUEL VAPOR AND AIR EDUCTOR SYSTEM

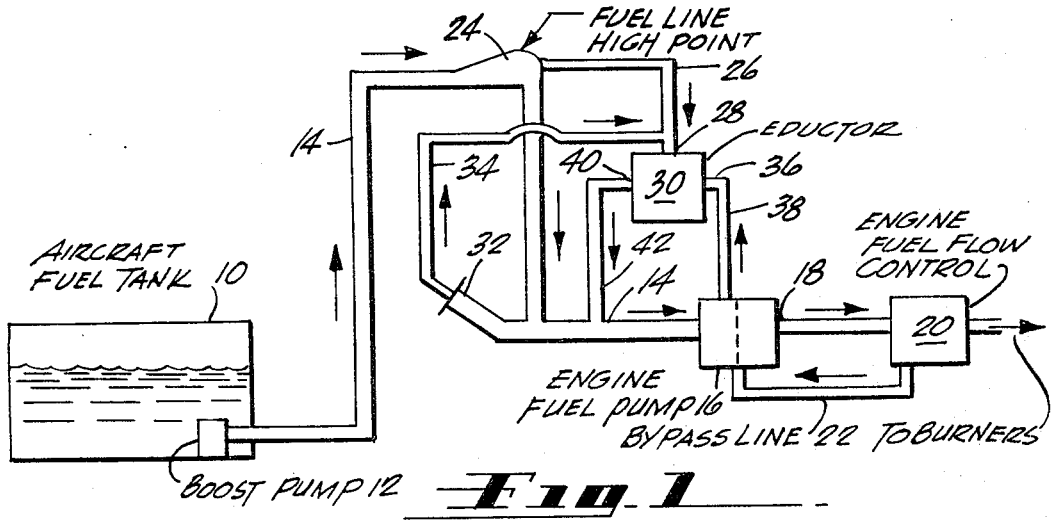
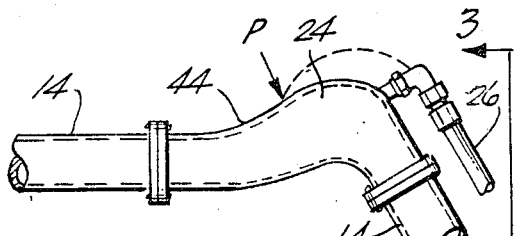
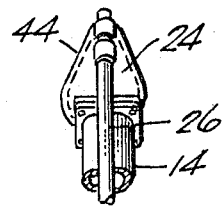
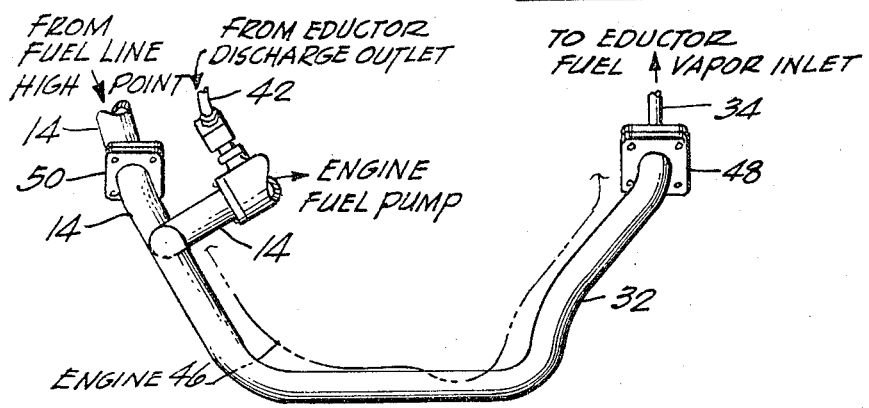

INVENTORS
ALBERT HEINECKE
WALTER B. KING
HENRY F. WINCHESTER

BY Dock N. Jee
— AGENT —

# United States Patent Office 3,387,644
Patented June 11, 1968

3,387,644
FUEL VAPOR AND AIR EDUCTOR SYSTEM
Albert Heinecke and Walter B. King, Los Angeles, and Henry F. Winchester, Rolling Hills Estates, Calif., assignors, by mesne assignments, to McDonnell Douglas Corporation, Santa Monica, Calif., a corporation of Maryland
Filed Sept. 15, 1966, Ser. No. 579,649
10 Claims. (Cl. 103—5)

ABSTRACT OF THE DISCLOSURE

A chamber shaped to produce quiescent and non-turbulent flow therethrough is derived from a portion of a fuel line at the high point thereof to collect any fuel vapor and air evolved from fuel passing through the fuel line to a fuel pump. The chamber communicates with an eductor which is driven by circulated excess fuel obtained from the fuel pump. Any collected fuel vapor and air drawn into the eductor is mixed with the excess fuel circulated through it to form a fine emulsion which is safely returned to the fuel line at a selected point before the fuel pump.

---

Our invention relates generally to fuel systems and more particularly to a fuel vapor and air removal system for the fuel feed system of aircraft jet engines and the like.

The main fuel tanks in airplanes are usually installed in the wings thereof and fuel feed lines are suitably routed from the tanks to each aircraft engine. Where the aircraft engines are mounted to the aft fuselage section of an airplane, the fuel lines are routed from the wing tanks into the fuselage, through the fuselage and then out to each engine.

Fuel is normally fed from the fuel tanks with boost pumps mounted in the tanks. The pressurized flow of fuel is generally accepted by a two-stage, engine-driven fuel pump at each engine. The first stage of the fuel pump is a centrifugal pump and the second stage is a gear pump, for example. The fuel pump raises the fuel flow pressure above the minimum value (approximately 135 p.s.i.g.) required for entering the flow control device which delivers the fuel to the burners of the aircraft jet engine.

In the event that electrical power to the boost pumps in the fuel tanks is lost or for any other reason that the boost pumps should become inoperative while in flight, fuel must be supplied to the engine-driven fuel pumps through suction developed by such fuel pumps. However, it is well-known that suction feed flow, particularly at high altitudes and/or temperatures, tends to evolve large quantities of air or vapor from the volatile jet engine fuel due to line pressure drops encountered while flowing in the fuel lines to the fuel pumps.

Centrifugal type pumps are quite susceptible to cavitation when the liquid supplied thereto includes any large air or vapor pockets. Since the first stage of the aircraft fuel pumps is a centrifugal pump, cavitation occurs therein when the supply fuel thereto has evolved substantial quantities of air or vapor. Fuel pump interstage pressure drops to nearly zero in this instance and the second stage gear pump cannot supply fuel at the minimum pressure required by the fuel control device such that immediate stoppage of fuel flow to the corresponding engine results and the engine flames-out.

It is an object of our invention to provide a novel and useful fuel vapor and air removal system which effectively removes air or vapor evolved in the fuel lines before large pockets can form therein to cause disruption of operation of the engines supplied by the fuel lines.

Another object of the invention is to provide a fuel vapor and air removal system which is highly efficient and reliable in operation, the removal system being relatively simple in structure and driven by excess fuel available from the regular, engine-driven fuel pump of an associated engine.

A further object of this invention is to provide a fuel vapor and air removal system which is comparatively very light in weight and requires minimum maintenance, the removal system utilizing components having no moving parts.

A still further object of the invention it to provide a fuel vapor and air removal system which effectively removes fuel vapor and air from the fuel lines and reentrains the same in a safe (high fuel volume to air volume ratio) form back into a fuel feed system.

Yet another object of this invention is to provide a fuel vapor and air removal system which does not interfere with the normal operation of the fuel feed system of an engine at any time.

Other objects and advantages of our invention will become apparent, and the novel features thereof will be made more evident, from the following detailed description of an exemplary embodiment of the invention. The description is to be taken in conjunction with the accompanying drawings, in which:

FIGURE 1 is a diagrammatic drawing illustrating a fuel vapor and air removal system in accordance with our invention;

FIGURE 2 is a fragmentary, side elevational view of the fuel line including a high point chamber associated with the fuel vapor and air removal system;

FIGURE 3 is an end view of the high point chamber housing as taken along the line 3—3 indicated in FIGURE 2;

FIGURE 4 is a fragmentary, frontal view of the fuel line portion located adjacent to an aircraft jet engine;

Figure 5:
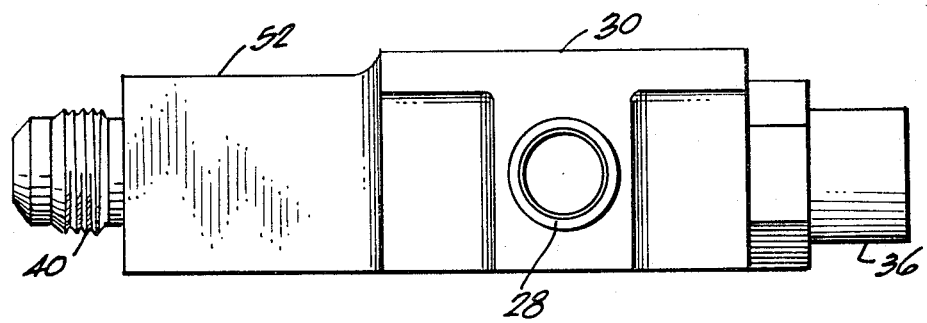
FIGURE 5 is a top plan view of the eductor device which is preferably used in the fuel vapor and air removal system.

FIGURE 1 diagrammatically shows an aircraft fuel tank 10 having a boost pump 12 which normally boosts fuel from the tank 10 through fuel feed line 14 to the two-stage, engine-driven fuel pump 16 that pumps fuel through line 18 to the flow control device 20 which meters the fuel to the burners of the aircraft jet engine (not shown in this figure). Excess fuel delivered to the flow control device 20 is returned to the fuel pump 16 at a point between the outlet of the first centrifugal stage and the inlet of the second positive displacement gear stage by a bypass line 22.

A high point chamber 24 is located at the high point of the fuel feed line 14, and a smaller line 26 connects the chamber 24 to the fuel vapor inlet 28 of eductor 30. An extension branch 32 of the feed line 14, extending in a direction away from the fuel pump 16, is also connected to the fuel vapor inlet 28 through a smaller line 34. Nozzle inlet 36 of the eductor 30 is connected through line 38 to the fuel pump 16, tying in with the outlet of the centrifugal stage. Discharge outlet 40 of the eductor 30 can be connected back to the feed line 14 near the inlet to the fuel pump 16 through line 42. The discharge outlet 40 may, if convenient, be desirably connected back to the fuel tank 10. Illustratively, the fuel feed line 14 is nominally a 1½ inch line and the eductor lines 26, 34, 38 and 42 are nominally ⅜ inch lines.

Under normal operation, the boost pump 12 supplies fuel from tank 10 under pressure through the feed line 14 to the fuel pump 16 which pumps fuel at an appropriate pressure to the flow control device 20 that meters the proper fuel flow to the burners of the aircraft engine. Fuel flow circulating from line 38 through the eductor 30 to line 42 and back to the fuel pump 16 causes the eductor 30 to draw off any air and fuel vapor collected in the chamber 24 and in the extension branch 32 of the feed line 14. When the boost pump 12 is operating properly, the air and fuel vapor collected in the chamber 24 and in the extension branch 32 are quickly removed in a very short time period after starting of the aircraft engine. The chamber 24, extension branch 32, and the lines 26 and 34 will be filled with fuel such that the eductor 30 will pump and circulate fuel which is substantially clear of air or vapor pockets during normal operation of the boost pump 12.

Should the boost pump 12 become inoperative for any reason, fuel will be supplied under suction feed developed by the fuel pump 16. Under these circumstances, especially with the aircraft at high altitudes and temperatures, the volatile jet engine fuel tends to evolve large quantities of air or vapor from the fuel as it encounters line pressure drops while flowing in the feed line 14. The evolved air and vapor will tend to collect at the physical high point of the feed line 14 and, for this reason, the chamber 24 is provided at that point to collect the air and vapor evolved from the flowing fuel. The feed line 14 is gradually expanded in cross sectional area as indicated in FIGURE 1 to slow fuel flow gradually to obtain and maintain a quiescent, non-turbulent flow. The chamber 24 is essentially a separation and collection chamber wherein a sufficient amount of top volume is provided to collect the air or vapor evolved from the fuel. The feed line 14 may, for example, expand linearly and gradually from its nominal 1½ inch diameter cross section to an equivalent 3 inch diameter cross section over a line length of approximately 5 inches to produce the chamber 24.

The fuel flowing from line 38 through the eductor 30 and out into the line 42 will cause the eductor 30 to draw off the air and vapor collected in the chamber 24 through line 26, and also any air trapped in the extension branch 32 of the feed line 14 through line 34. The eductor 30 mixes the air and fuel vapor with the fuel flow stream through the eductor 30 to form a fine bubble emulsion which can be safely discharged into the feed line 14 at or near the inlet to the fuel pump 16. It is evident that the structure and relative dimensions of certain parts of the eductor 30 must be made such that a proper mixture emulsion will be obtained.

Further, it should be apparent that there must be a proper balance of the volume of the chamber 24 and the pumping capacity of the eductor 30 in order that proper operation of the system will be achieved. When the fuel feed system of FIGURE 1 is functioning normally, the boost pump 12 is operating, and the chamber 24 and lines 26 and 34 are filled with fuel which is being pumped by the eductor 30. Obviously, the size of the chamber 24 and the pumping capacity of the eductor 30 should not be any larger than necessary for proper operation when the system is on suction feed due to inoperation of the boost pump 12. It is noted that only air trapped in the extension branch 32 of line 14 following line installation or maintenance need be removed through line 34 by the eductor 30 at engine start, and the extension branch 32 and line 34 are usually filled with fuel during suction feed.

The altitude of the aircraft and the temperature of the fuel in the feed system will affect the amount of air and vapor which is evolved from the flowing fuel due to pressure drops encountered in the feed lines. The configuration and volume of the chamber 24 is preferably such that it will separate and accommodate at least the maximum amount of air and vapor which could be evolved from the flowing fuel. The pumping capacity of the eductor 30 must, of course, be adequate to draw from the chamber 24 essentially at least that amount of air and vapor which is being separated and collected in the chamber 24. This pumping capacity, however, must not exceed that which would pump too much air and vapor for proper mixing and discharge near the inlet of the fuel pump 16.

FIGURES 2 and 3 illustrate the configuration of a housing 44 which provides a suitable chamber 24 at the fuel line high point. The housing 44 may, for example, be a light steel shell. It can be seen from FIGURE 2 that the cross sectional area of the housing 44 gradually increases as a result of the progressive rise of the upper edge of the housing 44 as taken with respect to the relatively slight rise of its lower edge. The resulting chamber 24 is generally peaked (oval shaped) as shown in FIGURE 3 and the connection point of the line 26 to the chamber 24 is located at the forward apex thereof. Thus, the separated and collected air and vapor is funneled readily into the line 26 to the eductor 30. The overall length of the housing 44 is approximately 13 inches long but the expanded chamber portion covers only about 5 or 6 inches of such length.

The fuel feed line 14 has a fairly sharp drop at the right connecting end of the housing 44 as may be seen in FIGURE 2. In some aircraft, the fuel feed system may have a high point where the fuel line is such that it is quite flat at both sides of the collecting chamber portion of the line. For example, the line 14 may have an angle of about 10 or 12 degrees from horizontal to and from the chamber portion thereof. In this instance, it is often desirable to provide two connection points to the chamber 24 in order to assure better eduction thereof. The line 26 can illustratively be connected as shown in FIGURE 2 and, additionally, to the point P of the housing 44 as indicated. This is particularly desirable where the chamber 24 must be relatively long and flat because of existing aircraft structure preventing the use of a more concentrated (shorter) and higher chamber.

FIGURE 4 is a fragmentary frontal view, looking aft of a portion of the feed line 14 near the indicated engine 46 which is mounted to the left side of the fuselage near the tail of an airplane. The extension branch 32 of the feed line 14 generally curves around the lower contour of the engine 46 and is essentially closed at the end by plate connection 48 except for the connecting line 34. The feed line 14 from the fuel line high point also has a plate connection 50 which is, of course, an open connection.

The section of the feed line 14, including its extension branch 32, between the plate connections 48 and 50 is shown in FIGURE 4 can be used with the other engine which is mounted to the right side of the fuselage near the tail. In this instance, the feed line 14 from the fuel line high point would be connected to plate connection 48 which is then an open connection and the line 34 would be connected to the now essentially closed plate connection 50. Thus, the extension branch 32 shown in FIGURE 4 would become the feed line for the right engine. This is the case, for example, in the Douglas DC-9 transport which utilizes this invention.

Figure 6:
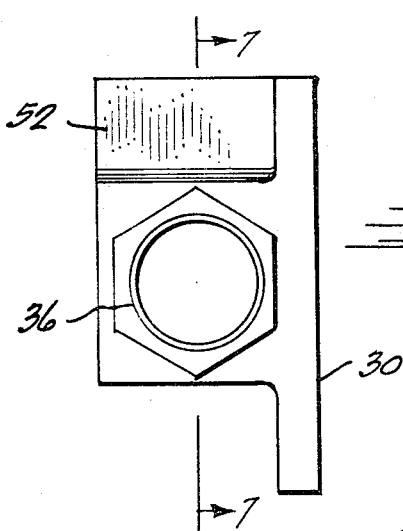
FIGURE 6 is an end elevational view of the eductor device shown in FIGURE 5.
Figure 7:
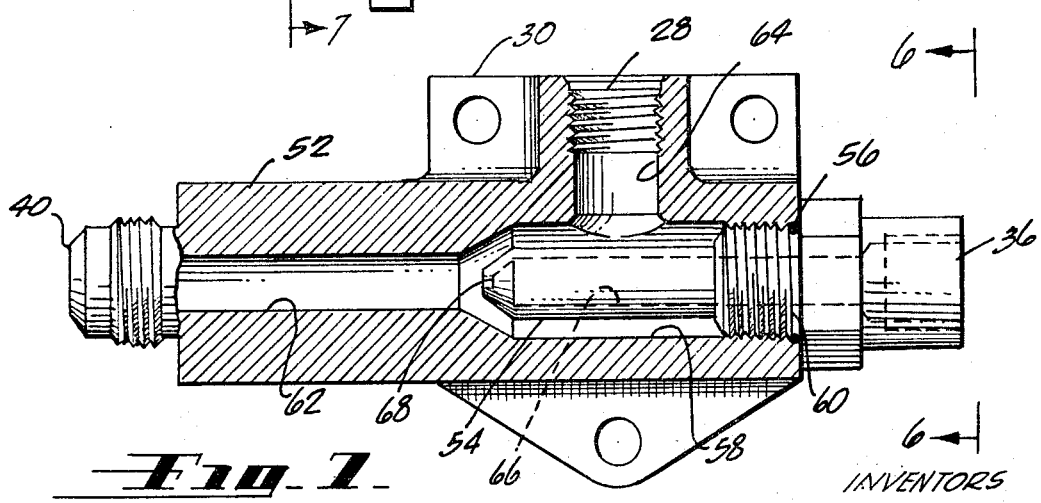
FIGURE 7 is a front elevational, largely sectional view of the eductor device as taken along the line 7—7 indicated in FIGURE 6.

FIGURES 5, 6 and 7 are views which illustrate a preferred embodiment of the eductor 30. The eductor 30 includes a housing 52 having a nozzle 54 (FIGURE 7) threaded into one end of the housing. The fuel vapor inlet 28 is provided, for example, at a point intermediate to the nozzle inlet 36 and the discharge outlet 40. A suitable seal 56 is provided at the right end of a cylindrical passageway 58 in the housing 52, engaging a groove 60 in the nozzle 54. The left end of the passageway 58 tapers down and joins with a smaller cylindrical passageway 62 ending in the discharge outlet 40.

The passageways 58 and 62 are located along central axes which are coincident when extended. The nozzle 54 is also located on the coincident axes and is positioned concentrically within the passageway 58. Intersecting at right angles with the passageway 58 is another passageway 64 which leads from the fuel vapor inlet 28. The nozzle 54 has a cylindrical internal passageway 66 which tapers down to a small outlet 68. The diameter of the outlet 68 is 0.090 inch and the diameter of the passageway 62 is 0.335 inch, for example. The area ratio here is illustratively 1 to 14. Other dimensions of the eductor 30 are shown generally in proportion in FIGURES 5, 6 and 7.

The eductor 30 is a venturi device wherein the increased velocity and consequently lowered pressure at the outlet 68 causes the pumping (suction) action at the inlet 28 to draw off the vapor and air collected in the chamber 24 (FIGURE 1) throught the connecting line 26. This vapor and air is entrained in the fuel flow and thoroughly mixed in the passageway 62 to form a fine bubble emulsion which can be safely discharged into the supply fuel at the inlet of the engine-driven fuel pump 16. It is, of course, to be remembered that it will be rare that the boost pumps 12 or their electrical supply will become inoperative or fail under the proper maintenance procedure for modern aircraft. Thus, negative pressure suction feed conditions in the feed lines normally would only occur during test operations under simulated environmental conditions of altitude, temperature, fuel flow rate, etc.

While some specific dimensions and one type of material have been given above in connection with the exemplary embodiment of our invention, such specific details are provided merely as examples only and are not intended to limit or restrict the scope of this invention. Similarly, it is to be understood that the particular embodiment of our invention as described above and shown in the accompanying drawings is merely illustrative of, and not restrictive on, the broad invention and that various changes in design, structure and arrangement may be made without departing from the spirit and scope of the appended claims.

We claim:

1. In a fuel feed system wherein a fuel tank including a booster pump normally supplies fuel through a fuel line to a fuel pump adapted to supply an engine, the combination with said fuel line and said fuel pump of
a chamber derived from a portion of said fuel line at a high point thereof for collecting any fuel vapor and air evolved from fuel passing through said fuel line;
a separate eductor having no moving parts and adapted to be driven by fuel circulating from an outlet of said fuel pump through said eductor and returning to a selected point of said fuel feed system; and
a line connecting said chamber to an inlet of said eductor whereby fuel vapor and air drawn from said chamber into said eductor is finely mixed with the fuel circulating through it.

2. Apparatus as defined in claim 1 wherein said chamber is formed at the high point of said fuel line by gradually increasing its cross sectional area in the direction of fuel flow over a predetermined length thereof whereby the fuel flow is gradually slowed to obtain and maintain a quiescent, non-turbulent flow therein.

3. Apparatus as defined in claim 1 wherein said chamber is relatively long and flat with respect to the adjoining portions of said fuel line and said chamber connecting line connects at least two axially separated apex outlets located near respective ends of said chamber, to the inlet of said eductor.

4. Apparatus as defined in claim 2 wherein the fuel circulated through said eductor is returned to said fuel line near the inlet of said fuel pump.

5. Apparatus as defined in claim 2 wherein said fuel pump is an engine-driven fuel pump, and excess fuel is derived from said fuel pump for circulation through said eductor.

6. Apparatus as defined in claim 2 wherein said fuel line has an extension branch and including in addition, a line connecting said extension branch to the inlet of said eductor whereby any fuel vapor and air trapped in said extension branch is drawn into said eductor and finely mixed with the fuel circulating through it.

7. Apparatus as defined in claim 1 wherein said chamber is formed at the high point of said fuel line by a connecting housing having a generally peaked cross section which is gradually increased in area in the direction of fuel flow over a predetermined length of said housing whereby the fuel flow is gradually slowed to obtain and maintain a quiescent, non-turbulent flow therein.

8. Apparatus as defined in claim 2 wherein said eductor includes a housing having a mixing passageway therein, a nozzle connecting with the outlet of said fuel pump and mounted to said housing such that the outlet of said nozzle is disposed near the inlet of said mixing passageway, the outlet of said mixing passageway being adapted to be connected to said fuel line near the inlet of said fuel pump, a housing inlet which is the inlet of said eductor, and a fluid passageway connecting said housing inlet to a point near the outlet of said nozzle, the aforesaid parts of said eductor having relative dimensions whereby a fine mixture emulsion of fuel, vapor, air and fuel is obtained from the outlet of said mixing passageway and which can be safely returned to the fuel line near the inlet of said fuel pump.

9. Apparatus as defined in claim 7 wherein said eductor includes a housing having a mixing passageway therein, a nozzle connecting with the outlet of said fuel pump and mounted to said housing such that the outlet of said nozzle is disposed near the inlet of said mixing passageway, the outlet of said mixing passageway being adapted to be connected to said fuel line near the inlet of said fuel pump, a housing inlet which is the inlet of said eductor connected by said line to a forward apex of said chamber, and a fluid passageway connecting said housing inlet to a point near the outlet of said nozzle, the aforesaid parts of said eductor having relative dimensions whereby a fine mixture emulsion of fuel vapor, air and fuel is obtained from the outlet of said mixing passageway and which can be safely returned to the fuel line near the inlet of said fuel pump.

10. Apparatus as defined in claim 7 wherein said fuel pump is an engine-driven fuel pump including a centrifugal stage and a gear stage, and excess fuel is derived from the outlet of said centrifugal stage of said fuel pump for circulation through said eductor and returned to said fuel line near the inlet of said fuel pump, said eductor including a housing having a mixing passageway therein, a nozzle connecting with the outlet of said centrifugal stage of said fuel pump and mounted to said housing such that the outlet of said nozzle is disposed near the inlet of said mixing passageway, the outlet of said mixing passageway being adapted to be connected to said fuel line near the inlet of said fuel pump, a housing inlet which is the inlet of said eductor connected by said line to a forward apex of said chamber, and a fluid passageway connecting said housing inlet to a point near the outlet of said nozzle, the aforesaid parts of said eductor having relative dimensions whereby a fine mixture emulsion of fuel vapor, air and fuel is obtained from the outlet of said mixing passageway and which can be safely returned to the fuel line near the inlet of said fuel pump.

References Cited

UNITED STATES PATENTS

| | | | |
|---|---|---|---|
| 2,414,158 | 1/1947 | Mock | 158—36.4 |
| 2,865,442 | 12/1958 | Halford et al. | 158—36.3 |
| 2,901,031 | 8/1959 | Powell et al. | 158—36.4 |
| 3,319,569 | 5/1967 | Norris et al. | 158—36.3 |

JAMES W. WESTHAVER, *Primary Examiner.*